US008825369B2

(12) United States Patent
Jin

(10) Patent No.: US 8,825,369 B2
(45) Date of Patent: Sep. 2, 2014

(54) TELEMATICS TERMINAL AND METHOD FOR CONTROLLING VEHICLE USING THE SAME

(75) Inventor: Seung-Hee Jin, Seoul (KR)

(73) Assignee: LG Electronics Inc., Seoul (KR)

( * ) Notice: Subject to any disclaimer, the term of this patent is extended or adjusted under 35 U.S.C. 154(b) by 854 days.

(21) Appl. No.: 12/404,148

(22) Filed: Mar. 13, 2009

(65) Prior Publication Data
US 2010/0094500 A1   Apr. 15, 2010

(30) Foreign Application Priority Data

Oct. 14, 2008  (KR) ........................ 10-2008-0100784

(51) Int. Cl.
| G01C 21/00 | (2006.01) |
| G05D 1/02 | (2006.01) |
| G06F 17/10 | (2006.01) |
| G06G 7/78 | (2006.01) |
| G01C 21/26 | (2006.01) |
| G08G 1/0967 | (2006.01) |
| G08G 1/0969 | (2006.01) |
| H04W 4/02 | (2009.01) |

(52) U.S. Cl.
CPC .......... *G08G 1/096775* (2013.01); *G01C 21/26* (2013.01); *G08G 1/096725* (2013.01); *G08G 1/0969* (2013.01); *H04W 4/021* (2013.01)
USPC ............ 701/400; 701/408; 701/435; 701/300

(58) Field of Classification Search
USPC .......... 701/29, 300, 302, 200, 207, 208, 211, 701/400, 408, 414, 415, 423, 425, 435
See application file for complete search history.

(56) References Cited

U.S. PATENT DOCUMENTS

| 6,166,658 | A | 12/2000 | Testa |
| 7,317,927 | B2 * | 1/2008 | Staton et al. ............... 455/456.4 |
| 7,484,663 | B2 * | 2/2009 | Olsen et al. ................... 235/385 |
| 7,606,579 | B2 * | 10/2009 | Thacher ..................... 455/456.1 |
| 7,777,648 | B2 * | 8/2010 | Smith et al. ................ 340/995.1 |
| 7,848,765 | B2 * | 12/2010 | Phillips et al. ............. 455/456.3 |
| 7,873,158 | B2 * | 1/2011 | Sharma et al. ............... 379/386 |
| 7,899,610 | B2 * | 3/2011 | McClellan ................... 701/115 |
| 7,908,051 | B2 * | 3/2011 | Oesterling ................. 701/29.5 |
| 7,999,670 | B2 * | 8/2011 | McClellan et al. ...... 340/539.13 |
| 8,223,009 | B2 * | 7/2012 | Anderson et al. ......... 340/539.1 |
| 2003/0023377 | A1 | 1/2003 | Chen et al. |

(Continued)

FOREIGN PATENT DOCUMENTS

| DE | 198 07 291 A1 | 8/1999 |
| EP | 1 120 631 A1 | 8/2001 |
| KR | 10-2000-0067329 A | 11/2000 |
| WO | WO 2008/023916 A1 | 2/2008 |

*Primary Examiner* — Jason Holloway
*Assistant Examiner* — Nicholas Kiswanto
(74) *Attorney, Agent, or Firm* — Birch, Stewart, Kolasch & Birch, LLP

(57) ABSTRACT

A device and method for controlling a vehicle with a telematics terminal installed in or on the vehicle. The method includes a) receiving coordinates of a geo-fence area by the telematics terminal; b) determining whether or not the vehicle is located within the geo-fence area or is on a route that will intercept the geo-fence area; and c) if the vehicle is determined to have entered into the geo-fence area, controlling the vehicle to meet predetermined drive requirements previously set for the geo-fence area.

17 Claims, 7 Drawing Sheets

(56) References Cited

U.S. PATENT DOCUMENTS

| | | |
|---|---|---|
| 2003/0227395 A1 | 12/2003 | Zeineh |
| 2005/0021224 A1 | 1/2005 | Gray |
| 2005/0205719 A1* | 9/2005 | Hendrickson et al. .... 246/122 R |
| 2007/0129082 A1* | 6/2007 | Thacher .................... 455/456.1 |
| 2007/0143013 A1 | 6/2007 | Breen |
| 2007/0273558 A1* | 11/2007 | Smith et al. ................ 340/995.1 |
| 2008/0094256 A1 | 4/2008 | Koen |
| 2008/0162034 A1* | 7/2008 | Breen .......................... 701/202 |
| 2008/0186165 A1* | 8/2008 | Bertagna et al. ......... 340/539.13 |
| 2008/0288132 A1 | 11/2008 | King et al. |

\* cited by examiner

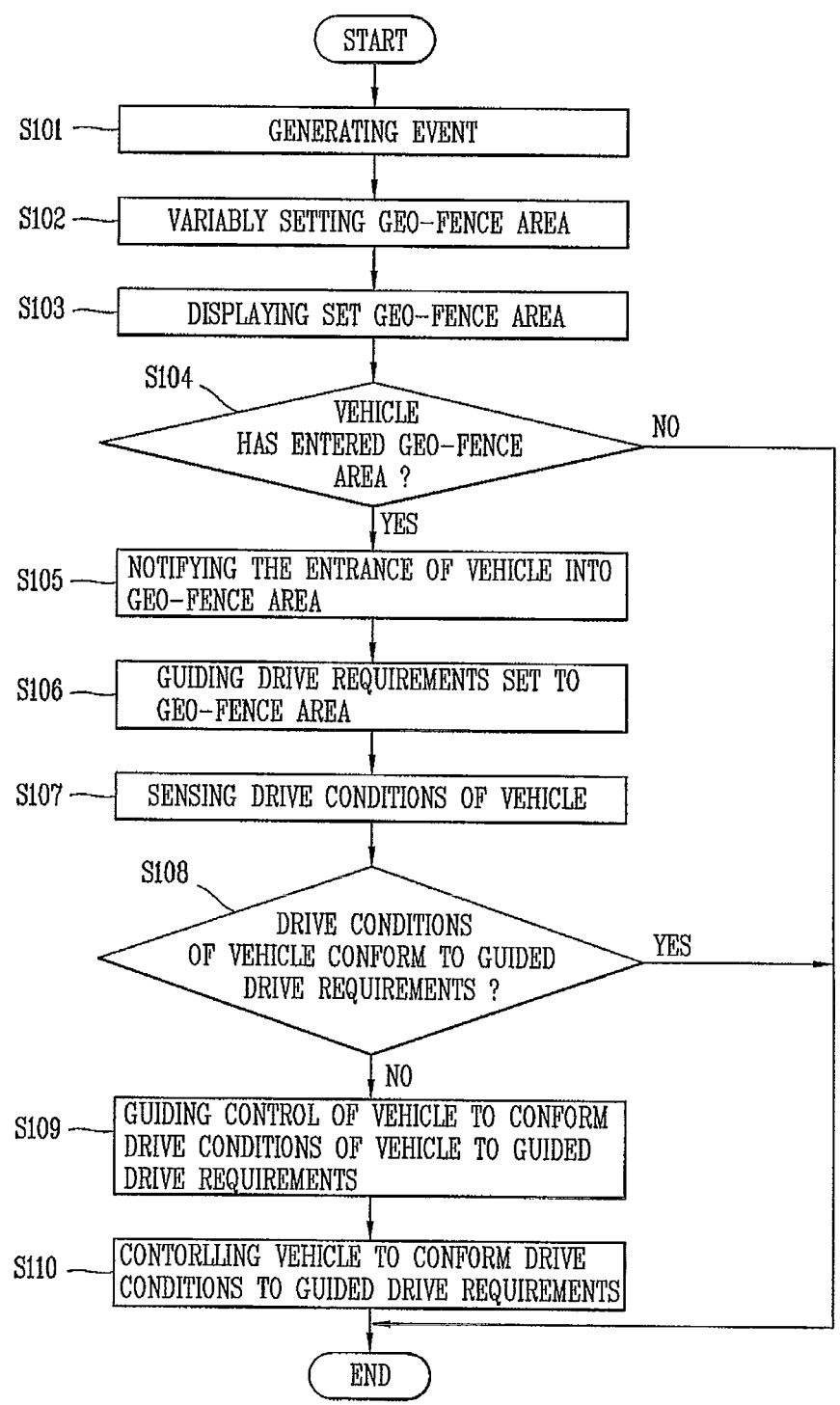

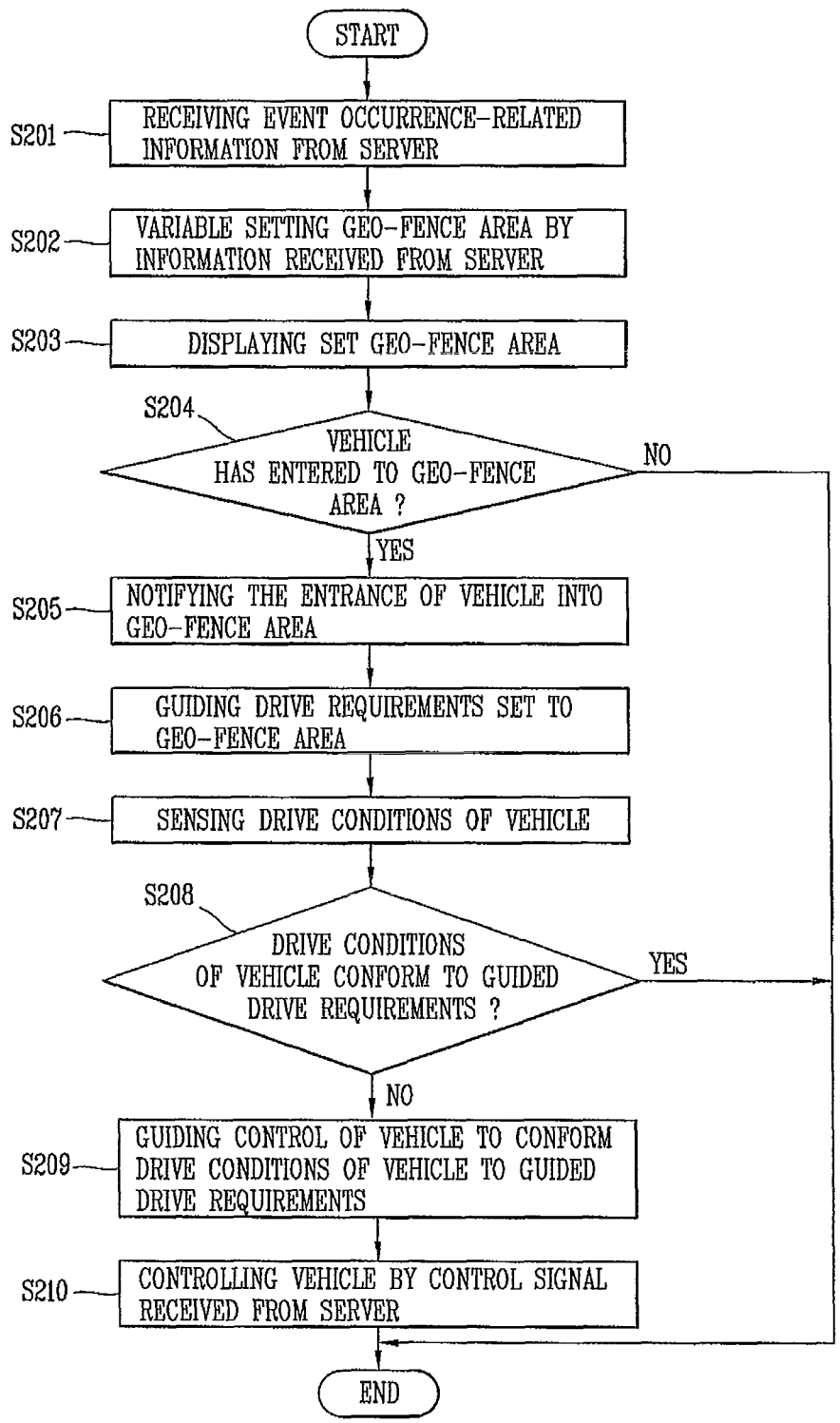

TELEMATICS TERMINAL AND METHOD FOR CONTROLLING VEHICLE USING THE SAME

CROSS-REFERENCE TO RELATED APPLICATIONS

Pursuant to 35 U.S.C. §119(a), this application claims the benefit of earlier filing date and right of priority to Korean Application No. 10-2008-0100784, filed on Oct. 14, 2008, the contents of which are hereby incorporated by reference herein in their entirety.

BACKGROUND OF THE INVENTION

1. Field of the Invention

The present invention relates to a telematics terminal capable of controlling a vehicle and a method for controlling a vehicle using the same.

2. Description of the Background Art

The term 'telematics' is a compound word of Telecommunications and Informatics, and is also known as Information and Communications Technology (ICT). More specifically, telematics is the science of sending, receiving and storing information via telecommunication devices.

More recently, telematics have been specifically applied to the use of Global Positioning System (GPS) technology integrated with computers and mobile communications technology in automotive navigation systems.

Vehicle telematics may be applied to various fields such as remote diagnostics for vehicles, diagnostics for in-vehicle electric/mechanical components, vehicle controls, communications between a call center and a vehicle or between vehicles equipped with telematics terminals, intelligent transportation systems, and an interface between a user and a vehicle.

As discovered by the present inventors, telematics may also be used for controlling moving objects (including vehicle) by using a telematics terminal in a vehicle equipped with the telematics terminal.

SUMMARY OF THE INVENTION

The present invention allows a vehicle within a variably set geo-fence area to be driven under prescribed requirements upon occurrence of events, thereby enhancing convenience and safety in a vehicle drive.

To achieve these and other advantages and in accordance with the purposes of the present invention, as embodied and broadly described herein, there is provided a method for controlling a vehicle by a telematics terminal. The method includes variably setting a geo-fence area upon occurrence of events; determining whether or not a vehicle has entered into the geo-fence area; and if the vehicle is determined to have entered into the geo-fence area, controlling the vehicle to meet drive requirements set to the geo-fence area.

Here, the events may include at least one of traffic accident occurrence, an increase of traffic volume, a decrease of traffic volume, environmental pollution, natural disasters and weather change.

The method may also include notifying that the vehicle has entered into the geo-fence area.

The method also may include receiving information related to the event occurrence from a server; and variably setting a geo-fence area by using the received information related to the event occurrence.

The method also may include receiving information related to a geo-fence area variably set by a server; and setting a geo-fence area by the received information.

The method also may include variably setting a geo-fence area by considering road information on which a vehicle can be driven if the event has occurred.

The method also may include notifying drive requirements set to the geo-fence area.

The method also may include sensing drive conditions of the vehicle; determining whether or not the sensed drive conditions of the vehicle meet the notified drive requirements; and if the drive conditions do not meet the drive requirements, controlling the vehicle such that the drive conditions of the vehicle meet the drive requirements.

The method also may include, if the drive conditions of the vehicle do not meet the drive requirements, guiding a control of the vehicle such that the drive conditions of the vehicle meet the drive requirements.

The drive requirements may relate to at least one of an opened or closed state of a window of a vehicle, a maximum or minimum speed of a vehicle, a distance between the vehicle and an object positioned front or rear thereof, a lit status of a lamp of a vehicle, a drive gear of a vehicle, a drive type of a vehicle, opening/closing or locking of a door of a vehicle, and a drive or detour on a specific road.

The method may also include controlling the vehicle by a control signal received from a server.

The method may also include displaying the set geo-fence area.

To achieve these and other advantages and in accordance with the purposes of the present invention, as embodied and broadly described herein, there is provided a telematics terminal. The telematics terminal includes a position-location module configured to recognize a location of a vehicle; a wireless communication unit configured to receive information related to an event occurrence from a server; and a controller configured to variably set a geo-fence area based on the event occurrence, determine whether or not the vehicle has entered to the geo-fence area, and control the vehicle to meet drive requirements set to the geo-fence area.

Here, the events may include at least one of traffic accident occurrence, an increase OT traffic volume, a decrease of traffic volume, environmental pollution, natural disasters and weather change.

The telematics terminal may also include an output unit configured to notify that the vehicle has entered into the geo-fence area.

The controller can variably set a geo-fence area by considering road information on which a vehicle can be driven if the event has occurred.

The telematics terminal may also include a controller configured to notify drive requirements set to the geo-fence area.

The telematics terminal may also include a sensing means configured to sense drive conditions of the vehicle, wherein if the drive conditions of the vehicle sensed by the sensing means do not meet the guided drive requirements, the controller performs a control of the vehicle such that the drive conditions meet the drive requirements.

The foregoing and other objects, features, aspects and advantages of the present invention will become more apparent from the following detailed description of the present invention when taken in conjunction with the accompanying drawings.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

In the drawings:

FIG. 2 is a flowchart showing a method for controlling a vehicle using a telematics terminal according to one embodiment of the present invention;

FIG. 3 is a flowchart showing a method for controlling a vehicle using a telematics terminal according to another embodiment of the present invention;

DETAILED DESCRIPTION OF THE INVENTION

Figure 1:
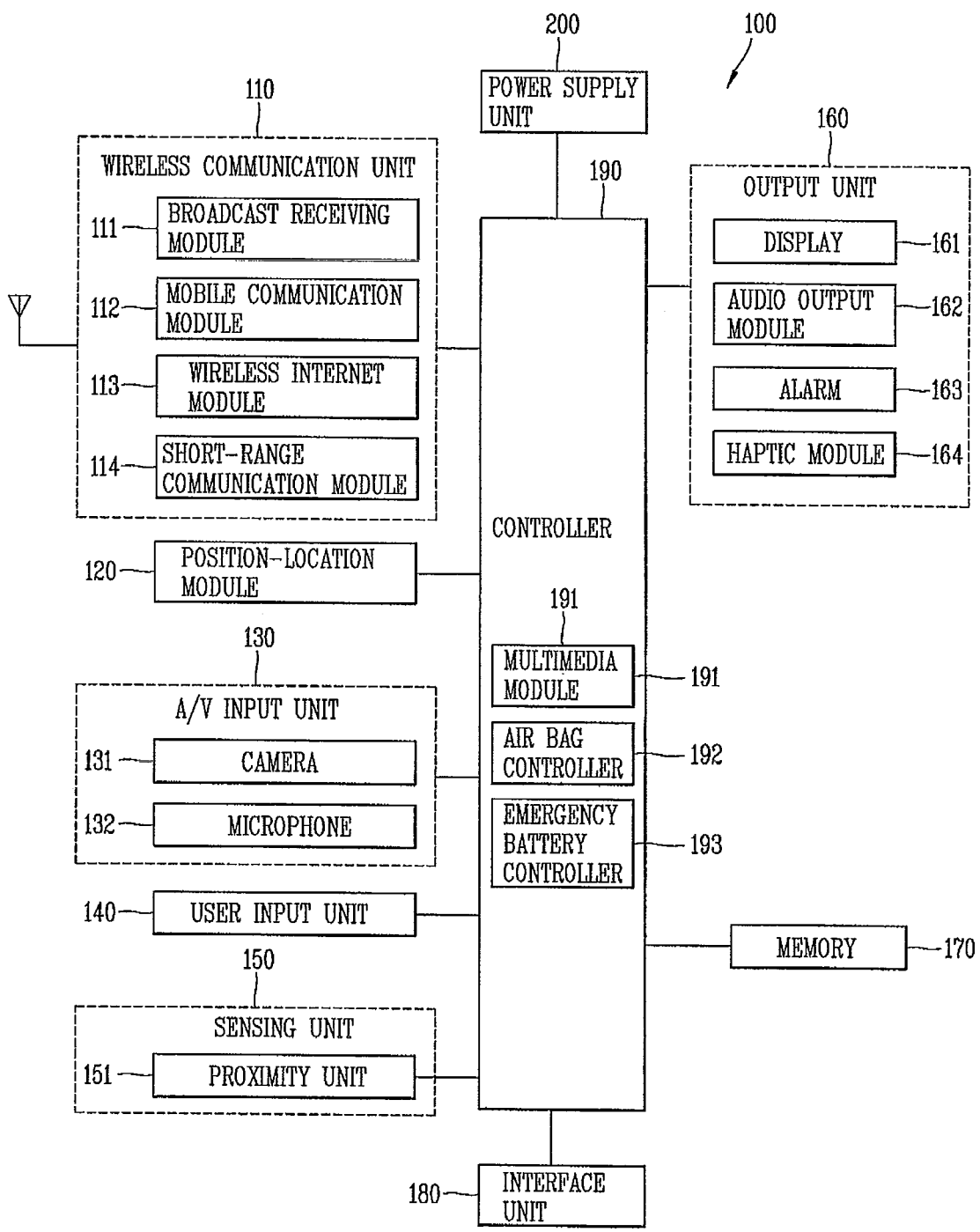
FIG. 1 is a schematic block diagram of a telematics terminal according to one embodiment of the present invention.

FIG. 1 is a block diagram showing an exemplary telematics terminal according to one embodiment of the present invention, and configured to execute one or more of the methods described below. For the various methods described below, the telematics terminal may be composed of components more or less than the components of FIG. 1.

The telematics terminal 100 includes a wireless communication unit 110, a position-location module 120, an audio/video (A/V) input unit 130, a user input unit 140, a sensing unit 150, an output unit 160, a memory 170, an interface unit 180, a controller 190, a power supply unit 200, and so on.

Hereinafter, the components will be explained in more detail.

The wireless communication unit 110 may include one or more modules configured to enable a wireless communication between the telematics terminal 100 and a wireless communications system, or between the telematics terminal 100 and a network where the telematics terminal 100 is located. For instance, the wireless communication unit 110 may include a broadcast receiving module 111, a mobile communication module 112, a wireless Internet module 113, a short range communication module 114, and so on.

The broadcast receiving module 111 may be configured to receive broadcasting signals and/or broadcasting related information from an external broadcasting management server through broadcasting channels.

The broadcasting channels may include satellite channels and terrestrial wave channels. The broadcasting management server may indicate a server to generate and transmit broadcasting signals and/or broadcasting related information, or a server to receive previously generated broadcasting signals and/or broadcasting related information and to transmit to the telematics terminal 100. The broadcasting signals may include not only TV or radio broadcasting signals and data broadcasting signals, but also broadcasting signals implemented as data broadcasting signals are coupled to TV or radio broadcasting signals.

The broadcasting related information may indicate information relating to broadcasting channels, broadcasting programs or a broadcasting service provider. The broadcasting related information may be provided through a mobile communication network. In this case, the broadcasting related information may be received by the mobile communication module 112.

The broadcasting related information may be implemented in various forms, such as Electronic Program Guide (EPG) of Digital Multimedia Broadcasting (DMB), or Electronic Service Guide (ESG) of Digital Video Broadcast-Handheld (DVB-H).

The broadcast receiving module 111 may receive digital broadcasting signals by using digital broadcasting systems such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DBV-H), Integrated Services Digital Broadcast-Terrestrial (ISDB-T). Here, the broadcast receiving module 111 may be configured to be adopted to not only the aforementioned digital broadcasting systems, but also any other broadcasting systems.

Broadcasting signals and/or broadcasting related information received through the broadcast receiving module 111 may be stored in the memory 170.

The mobile communication module 112 transmits or receives wireless signals to/from at least one of a base station, an external terminal, and a server on a mobile communication network. The wireless signals may include voice call signals, video call signals, or various types of data according to transmission/reception of text/multimedia messages.

The wireless Internet module 113 is a module for wireless Internet access, and may be internally or externally mounted to the telematics terminal 100. Wireless Internet techniques may include Wireless LAN (Wi-Fi), Wireless Broadband (Wibro), World interoperability for Microwave Access (Wimax), High Speed Downlink Packet Access (HSDPA), and so on.

The short range communication module 114 indicates a module for short range communication. Short range communication techniques may include Bluetooth, Radio Frequency Identification (RFID), Infrared Data Association (IrDA), Ultra Wideband (UWB), ZigBee, and so on.

The position-location module 120 indicates a module to obtain a position of the telematics terminal 100, and includes a Global Positioning System (GPS) as a representative example.

The GPS module receives signals from one or more GPS satellites. With three or more satellites, the GPS module applies a triangulation method to the calculated distance, thereby obtaining position information. The GPS module further applies Map matching, Dead reckoning, etc. to position information obtained by the triangulation method, thereby enhancing precision of calculated position information.

The position-location module 120 may obtain position information of the telematics terminal 100 by using not only the GPS module, but also various techniques such as Cell tower signals, wireless Internet signals, and a Bluetooth sensor. The techniques are referred to as 'Hybrid Positioning System'.

Referring to FIG. 1, the AN input unit 130 serves to input audio or video signals, and may include a camera 131, a microphone 132, and so on. The camera 131 processes image frames such as still pictures or video obtained by an image sensor in a capturing mode. Then, the processed image frames may be displayed on the display 161.

The image frames processed by the camera 131 may be stored in the memory 170, or may be transmitted to outside through the wireless communication unit 110. The camera 131 may be implemented in two or more in number according to usage environments.

Further, the microphone 132 receives an external audio signal while the portable device is in a particular mode, such as a phone call mode, recording mode and voice recognition mode. The received audio signal is then processed and converted into digital data. Also, the microphone 132 may include assorted noise removing algorithms to remove noise generated in the course of receiving the external audio signal.

The user input unit 140 generates input data responsive to user's manipulations with respect to the telematics terminal. The user input unit 140 may be implemented as a key pad, a dome switch, a touchpad (e.g., static pressure/capacitance), a jog wheel and a jog switch. The user input unit 140 may be also implemented as a steering wheel, an acceleration pedal, a brake pedal, a gear shift of a vehicle, and so on.

The sensing unit 150 may be configured to sense a current status of a vehicle or the telematics terminal 100, such as presence or absence of user contact with the telematics terminal 100, opening or closing of a vehicle door or window, whether or not a passenger has fastened a safety belt, manipulated statuses of a steering wheel, an acceleration pedal, a brake pedal, a gear shift, etc., a temperature inside or outside a vehicle, presence or absence of crash of a vehicle with an object, and a crash degree, a distance between a vehicle and an object, a status of components mounted to a vehicle, a lit status or brightness of a lamp mounted to inside or outside of a vehicle, and whether or not a passenger has been seated. Then, the sensing unit 150 generates a sensing signal to control an operation of the telematics terminal 100 or a vehicle. For instance, the sensing unit 150 may sense an opened status of a vehicle door, or a user's seated status by using a pressure applied to a seat. The sensing unit 150 may also sense whether power has been supplied from the power supply unit 200, or whether the interface unit 180 has been coupled to an external device or a vehicle component. The sensing unit 150 may include a proximity sensor 151.

The output unit 160 serves to generate video, audio, or tactile outputs, and may include the display 161, an audio output module 162, an alarm 163, a haptic module 164, etc.

The display 161 displays information processed by the telematics terminal 100. For instance, when the telematics terminal 100 is in a route guidance mode, the display 161 displays User Interface (UI) or Graphic User Interface (GUI) relating to the route guidance. However, when the telematics terminal 100 is in a video call mode or an image capturing mode, the display 161 displays captured or received images, or UI or GUI.

The display 161 may include at least one of a Liquid Crystal Display (LCD), a Thin Film Transistor-Liquid Crystal Display (TFT-LCD), an Organic Light-Emitting Diode (OLED), a Flexible Display, a 3D Display.

Some of the above displays may be configured as transparent or transmissive type of displays. These displays may be referred to as 'transparent displays', and include a Transparent OLED (TOLED) as a representative example.

The display 161 may be implemented as a Head Up Display (HUD). The display 161 may be mounted to a front glass of a vehicle, or a door window. Here, the display 161 may be implemented as a transparent or transmissive type.

Two or more displays 161 may be implemented according to a configuration of the telematics terminal 100.

When the display 161 and a sensor to sense a touch operation (hereinafter, will be referred to as 'touch sensor') have a structure to be layered with each other, the display 161 may serve as an input device as well as an output device. The touch sensor may be implemented as a touch film, a touch sheet, a touch pad, and so on.

The touch sensor may be configured to convert changes of a pressure applied to a specific portion of the display 161, or changes of a capacitance occurring from a specific portion of the display 161, into electric input signals. The touch sensor may be configured to sense not only a touch position and a touch area, but also a touch pressure.

Once touch inputs are sensed by the touch sensor, corresponding signals are transmitted to a touch controller. The touch controller processes the signals, and then transmits corresponding data to the controller 190. Accordingly, the controller 190 can sense a touch position on the display 161.

Referring to FIG. 1, the proximity sensor 151 may be arranged at an inner region of the telematics terminal covered by the touch screen, or near the touch screen. The proximity sensor indicates a sensor to sense presence or absence of an object approaching to a surface to be sensed, or an object disposed near a surface to be sensed, by using an electric field or infrared rays without a mechanical contact. The proximity sensor has a longer lifespan and a more enhanced utilization degree than a contact sensor.

The proximity sensor may include a transmissive type photoelectric sensor, a direct reflective type photoelectric sensor, a mirror reflective type photoelectric sensor, a high-frequency oscillation type proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electric field. In this case, the touch screen (touch sensor) may be categorized into a proximity sensor.

Hereinafter, a status that the pointer is positioned to be proximate onto the touch screen without contact will be referred to as 'proximity touch', whereas a status that the pointer substantially comes in contact with the touch screen will be referred to as 'contact touch'. The pointer in a status of 'proximity touch' is positioned so as to be vertical with respect to the touch screen.

The proximity sensor senses proximity touch, and proximity touch patterns (e.g., distance, direction, speed, time, position, moving status, etc.). Information relating to the sensed proximity touch, and the sensed proximity touch patterns may be output onto the touch screen.

The audio output module 162 may output audio data received from the wireless communication unit 110 or stored in the memory 160, in a call-receiving mode, a call-placing mode, a recording mode, a voice recognition mode, a broadcast reception mode, a route guidance mode, and so on. The audio output module 152 may output audio signals relating to functions performed in the telematics terminal 100, e.g., call signal reception sound, message reception sound, route guidance voice, and so on. The audio output module 162 may include a receiver, a speaker, a buzzer, and so on.

The alarm 163 outputs signals notifying occurrence of events from the telematics terminal 100. The events occurring from the telematics terminal 100 may include call signal reception, message reception, touch input, problems of components mounted to a vehicle, abnormal opening or closing of a vehicle door/window/trunk/hood/etc. (e.g., opening without a key, or opening without a pass code, or opening inside or outside a predetermined time), and so on. The alarm 163 may output not only video or audio signals, but also other types of signals such as signals notifying occurrence of events in a vibration manner. The video or audio signals may be output through the display 161 or the audio output module 162. Accordingly, the display 161 and the audio output module 162 may be categorized into some parts of the alarm 163.

The haptic module 164 generates various tactile effects. A representative example of the tactile effects generated by the haptic module 164 includes vibration. Vibration generated by the haptic module 164 may have a controllable intensity, a controllable pattern, and so on. For instance, different vibration may be output in a synthesized manner or in a sequential manner.

The haptic module 164 may generate various tactile effects including not only vibration, but also arrangement of pins vertically moving with respect to a skin surface contacting the haptic module 164, air injection force or air suction force through an injection hole or a suction hole, touch by a skin surface, presence or absence of contact with an electrode, effects by stimulus such as an electrostatic force, and reproduction of cold or hot feeling using a heat absorbing device or a heat emitting device.

The haptic module 164 may be configured to transmit tactile effects through a user's direct contact, or a user's muscular sense using a finger or a hand. The haptic module 164 may be implemented in two or more in number according to a configuration of the telematics terminal 100. The haptic module 164 may be provided at a portion to which a user frequently contacts. For instance, the haptic module 164 may be provided at a steering wheel, a gear shift, a seat, and so on.

The memory 170 may store programs to operate the controller 190, or may temporarily store input/output data (e.g., music, still images, moving images, map data, and so on). The memory 170 may store data relating to vibration and sound of various patterns output when touches are input onto the touch screen.

The memory 170 may be implemented using any type or combination of suitable memory or storage devices including a flash memory type, a hard disk type, a multimedia card micro type, a card type (SD or XD memory), random access memory (RAM), static random access memory (SRAM), electrically erasable programmable read-only memory (EEPROM), programmable read-only memory (PROM), read-only memory (ROM), magnetic memory, magnetic or optical disk, or other similar memory or data storage device. The telematics terminal 100 may operate on the Internet in association with a web storage that performs a storage function of the memory 170.

The interface unit 180 interfaces the telematics terminal 100 with all external devices connected to the telematics terminal 100. The interface 180 receives data or power from an external device, and transmits it to each component inside the telematics terminal 100. Otherwise, the interface 180 transmits data inside the telematics terminal 100 to an external device. The interface unit 180 may include a wire/wireless headset port, an external charger port, a wire/wireless data port, a memory card port, a port to connect a device having an identification module to the telematics terminal 100, an audio Input/Output (I/O) port, a video Input/Output (I/O) port, an earphone port, and so on.

The interface unit 180 may be implemented in the form of Controller-Area Network (CAN), Local Interconnect Network (LIN), FlexRay, Media Oriented Systems Transport (MOST), etc.

A recognition module may be implemented as a chip to store each kind of information to identify an authorization right for the telematics terminal 100, and may include a User Identity Module (UIM), a Subscriber Identity Module (SIM), a Universal Subscriber Identity Module (USIM), and so on. A device having the recognition module (hereinafter, will be referred to as 'identification device') may be implemented as a smart card type. Accordingly, the identification device may be connected to the telematics terminal 100 through a port. The identification device may be also implemented as a vehicle key type.

The controller 190 controls an overall operation of the telematics terminal 100. For instance, the controller 190 performs controls and processes relating to data communication, video call, route guidance, vehicle control, etc. The controller 190 may include a multimedia module 191 configured to play multimedia, an air bag controller 192 configured to control an air bag mounted to a vehicle, an emergency battery controller 193 configured to control an emergency battery mounted to a vehicle, and so on. The multimedia module 191, the air bag controller 192, and the emergency battery controller 193 may be implemented inside the controller 180, or may be separately implemented from the controller 190. The controller 190 may be referred to as 'Telematics Control Unit: TCU'.

The controller 190 may perform a pattern recognition process to recognize handwriting inputs or picture inputs on the touch screen, as texts or images, respectively.

The power supply unit 200 supplies power required by various components under the control of the controller 190. The provided power may be internal power, external power, or combination thereof.

The power supply unit 200 may be implemented as a battery mounted to a vehicle, or a battery independently mounted to the telematics terminal 100.

In addition, the above various embodiments may be implemented in a computer-readable medium using, for example, computer software, hardware, or some combination thereof.

For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by the controller 190.

For a software implementation, the embodiments described herein may be implemented with separate software modules, such as procedures and functions, each of which perform one or more of the functions and operations described herein. The software codes can be implemented with a software application written in any suitable programming language and may be stored in a memory (for example, the memory 170), and executed by a controller or processor (for example, the controller 190).

The telematics terminal 100 may be integrally implemented with a vehicle, or may be separately implemented from a vehicle so as to be detachably mounted to the vehicle.

Hereinafter, the telematics terminal 100 according to one embodiment of the present invention will be explained in more detail.

The wireless communication unit 110 may receive information related to an occurrence of any events via a wireless communication from a server or via a wired or wireless communication from a mobile communication terminal (e.g., from a cell phone, personal digital assistant (PDA) or other device). The events may include at least one of traffic accident occurrence, an increase of traffic volume, a decrease of traffic volume, environmental pollution, natural disasters and weather change. The increase and decrease of traffic volume may occur as a result of a traffic accident, weather change and the like. The environmental pollution may include sandstorms, excessive levels of carbon monoxide, nitrogen dioxide, fine particles, sulfurous acid gas, ozone, etc. in the atmosphere, or a warning (alert) caused by such phenomenon or the like. The natural disaster may include falling rocks, landslides, forest fire, avalanches, icy roads or the like, and signify a natural phenomenon that may affect traffic or a vehicle's capability. The events may also be related to human activity, such as a riot or other civil disturbance, a festival, a building fire, a chemical spill, or another human-caused event that may affect traffic or vehicle operations.

The wireless communication unit 110 may receive information related to geo-fence areas which may be circumscribed via a vehicle input device or via a remote server. A geo-fence area is an area having a certain characteristic. A geo-fence area may be an area to be avoided for one or more predetermined reasons. The duration, size and/or shape of a geo-fence may vary based upon the conditions leading to the creation of the geo-fence, or subsequent to the creation of the geo-fence. If the wireless communication unit 110 receives information only related to the occurrence of any events from a remote server as will be described later, the geo-fence areas may be circumscribed by the controller 190. The wireless communication unit 110 may receive a control signal for controlling a vehicle from the server.

The controller 190 may circumscribe geo-fence areas based upon a user input or upon occurrence of one or more predetermined events, such as those listed above. The presence or absence of the event occurrence may be determined by the event occurrence-related information received from the server, or by a certain event occurrence detected by the sensing means.

In one embodiment, if a traffic accident occurs, the controller 190 may set a road adjacent to a spot where the traffic accident took place as a border to a corresponding geo-fence area. If a traffic jam has been caused by a traffic accident or if traffic conditions deteriorate, the controller 190 may enlarge a range of a previously set geo-fence area. On the contrary, if traffic conditions improve, the controller 190 may reduce the range of the geo-fence area.

When setting the geo-fence area, the controller 190 may consider road characteristics and other information.

For instance, the controller may circumscribe the geo-fence area by considering one or more roads on which the vehicle can be driven, or by considering traffic volume around the geo-fence area, or the like.

In another embodiment, if environmental pollution (e.g., due to an increase of ozone measurements in the atmosphere) has occurred, the controller 190 may circumscribe an area where its atmospheric measurements have exceeded a preset value as the geo-fence area. Later, if the atmospheric conditions have changed, the controller 190 may vary the size or shape the geo-fence area according to the change.

If the position of the vehicle is detected (sensed) by the position-location module 120, the controller 190 can use the detected position of the vehicle to determine whether or not the vehicle is inside or outside the geo-fence area. The controller may also compare a planned route to a geo-fence area to determine if the route will intersect the geo-fence area. The controller may recommend detours out of or around the geo-fence area.

The controller may recommend vehicle operating conditions and/or may actively control the vehicle so as to meet drive requirements corresponding to conditions in the geo-fence area. The drive requirements may include at least one of an opened or closed state of a window of a vehicle, a maximum or minimum speed of a vehicle, a distance between the vehicle and an object positioned in the front or rear thereof, a lit status of a lamp of a vehicle, a drive gear of a vehicle, a drive type of a vehicle, and an opened/closed state or locked state of a vehicle door, sunroof, hatch or convertible top.

The drive requirements may be set differently depending on the type of event corresponding to the geo-fence area. For instance, if the geo-fence is related to air pollution materials, the drive requirements may include closing of a window of a vehicle, lighting of a vehicle lamp, preventing a drive speed of a vehicle from exceeding a preset maximum speed, and the like.

As another example, if the geo-fence corresponds to poor road conditions by bad weather, the drive requirements may include preventing a drive speed of the vehicle from exceeding the preset maximum speed, recommending/setting a drive type to a 4-wheel drive, and the like.

As another example, if the geo-fence corresponds to the increase of traffic volume, the drive requirements may include recommending not driving or prohibiting driving in a section where traffic volume has increased, preventing a drive speed of the vehicle from exceeding the preset maximum speed, and the like.

The controller 190 may control the vehicle such that its drive conditions meet the drive requirements corresponding to the geo-fence area. The vehicle may perform a control operation under the control of the controller 190. The control operation may include an increase or decrease of a drive speed, opening or closing of a vehicle window or a door, a lit state of a vehicle lamp, a drive gear shift of a vehicle, a change in a drive type of a vehicle, locking or unlocking of a vehicle door, change in a preset drive route, and the like. The controller 190 may control the vehicle depending on the control signal received from the server.

As shown in FIG. 1, the output unit 160 may notify that a passenger and/or a remote server that the vehicle has entered a geo-fence area.

For instance, when the output unit 160 is implemented as the audio output module 162, the audio output module 162 may output a voice message notifying the entrance of the vehicle into the variably set geo-fence area, saying "you have entered an ozone alert area," "you have entered a high traffic area," "you have entered an area of poor road conditions" or the like.

As another example, if the output unit 160 is implemented as the haptic module 164, the haptic module 164 may vibrate when the vehicle has entered to the geo-fence area.

The controller 190 may notify a passenger of drive requirements which correspond to the geo-fence area.

For instance, i audio output module 162 may output a voice message for guiding drive requirements set to the variably set geo-fence area, saying "please, close the window," "do not exceed 55 miles per hour," "a 4-wheel drive is needed," "please, turn on the light" and the like.

Alternatively or in addition, the display 161 may visually display the drive requirements on the display screen.

If the drive conditions of the vehicle do not meet the above drive requirements, the controller 190 may guide the control of the vehicle such that the drive conditions of the vehicle meet the drive requirements.

For instance, the audio output module 162 may output a voice message for guiding a control of the vehicle so as to meet the drive requirements, saying "close the window, please," "slow down, please," "switch to the 4-wheel drive, please" "turn on the light please" and the like.

Alternatively or in addition, the display 161 may display a text message on the display screen, guiding a control of the vehicle so as to meet the drive requirements, including, "close the window, please," "slow down, please," "switch to the 4-wheel drive, please," etc., or may display a corresponding static or animated icon (e.g., a moving window or a blinking light).

The display 161 of the output unit 160 may visually display the geo-fence area on a map or other geographical display. An area corresponding to the geo-fence area may be displayed in a different color from a color indicating another geo-fence area, or an area corresponding to the geo-fence area may be hatched, flickered or otherwise discriminately displayed.

In another embodiment, one or more sensors may sense an occurrence of one or more events. The sensor(s) may include at least one of a crash sensor to sense a crash of a vehicle into an object, a sensor to sense component malfunctions, the position-location module 120, the wireless communication unit 110, a speed sensor, a door sensor, a window sensor, a microphone, a camera, a temperature sensor, a lamp flickering sensing sensor, a distance-to-exterior object sensor, and a vehicle drive type sensor.

For instance, if the sensor is implemented as the wireless communication unit 110, the wireless communication unit 110 receives traffic volumes of each road from the server, and the controller 190 may circumscribe an area where traffic volume exceeds a preset value as the geo-fence area.

In addition, if the sensor is implemented as the crash sensor and when an impulse greater than a preset value is sensed by the crash sensor, the controller 190 may consider the sensed impulse as an occurrence of a traffic accident and circumscribe a surrounding area as the geo-fence area.

The sensor may also detect drive conditions of the vehicle.

For instance, if the sensor is implemented as the window sensor, the window sensor may sense opening or closing of the window of the vehicle.

As another example, if the sensor is implemented as the speed sensor, the speed sensor may sense the speed of the vehicle.

FIG. 2 is a flowchart showing a method for controlling a vehicle using a telematics terminal according to one embodiment of the present invention.

Referring to FIG. 2, if a predetermined event has occurred (S101), the controller 190 circumscribes a corresponding geo-fence area (S102). The occurrence of any events (S101) may be reported from a remote sensor/server or may be sensed by using the sensor. If another event occurs after the geo-fence area has been set (S102), or if the original event ends or otherwise changes, the shape, size or duration of a previously geo-fence area may be changed.

Once the geo-fence area has been set, the set geo-fence area may visually be displayed (S103).

The controller 190 determines whether or not the vehicle has entered to the variably set geo-fence area (S104). If the vehicle is determined to have entered to the geo-fence area, the controller 190 may notify such information through the output unit 160 (S105). In addition, the controller 190 may inform or control one or more of the drive requirements corresponding to the geo-fence area through the output unit 160 (S106). The sensor senses drive conditions of the vehicle (S107), and determines whether or not the drive conditions of the vehicle meet the drive requirements of the geo-fence area (S108). The controller 190 may use the output unit 160 to inform a passenger that the vehicle do or do not meet the drive requirements (S109). Alternatively, if the drive conditions of the vehicle do not meet the drive requirements, the controller 190 may control the vehicle such that the drive conditions meet the drive requirements (S110).

FIG. 3 is a flowchart showing a method for controlling a vehicle using a telematics terminal according to another embodiment of the present invention.

In the method for controlling a vehicle using a telematics terminal shown in FIG. 3, explanations for portions that are the same as or similar to the embodiments and steps as described in FIG. 2 are omitted.

Referring to FIG. 3, if a predetermined event has occurred, a remote server may directly sense the event occurrence or may sense such occurrence by receiving information notifying the event occurrence.

Once the event occurrence has been sensed, the server transmits the sensed event occurrence to the telematics terminal 100 such that the telematics terminal 100 receives information related to the event occurrence (S201). The controller 190 uses the information related to the event occurrence received from the server to circumscribe a corresponding geo-fence area (S202).

The controller 190 determines whether or not the vehicle has entered to the variably set geo-fence area (S204). If the vehicle is determined to have entered to the geo-fence area, the controller 190 may notify such information through the output unit 160 (S205). In addition, the controller 190 may inform or control one or more of the drive requirements corresponding to the geo-fence area through the output unit 160 (S206). The sensor senses drive conditions of the vehicle (S207), and determines whether or not the drive conditions of the vehicle meet the drive requirements of the geo-fence area (S208). Also, the controller 190 may display a user alert asking the user to allow or disallow a change to one or more operating parameters If the drive conditions of the vehicle are determined not to meet the drive requirements, the server may transmit a control signal controlling the vehicle to the telematics terminal 100 (S209). The telematics terminal 100 may receive the control signal through the wireless communication unit 110, and the controller 190 may control the vehicle by the control signal (S210).

Figure 4A:
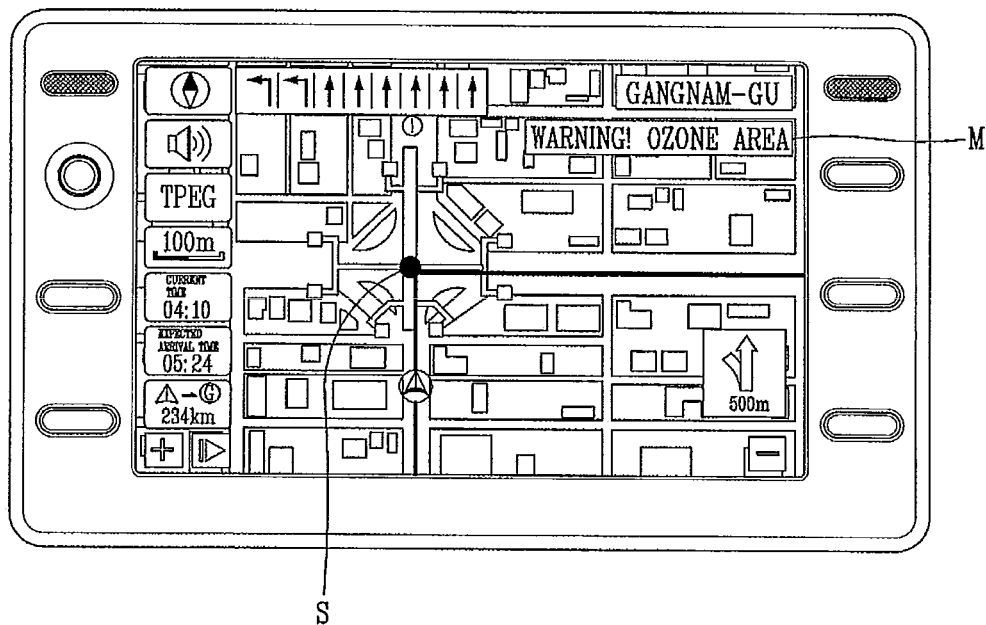
FIGS. 4a, 4b and 4c are exemplary views each showing a state that geo-fence areas are variably set by a telematics terminal according to another embodiment of the present invention.
Figure 4B:
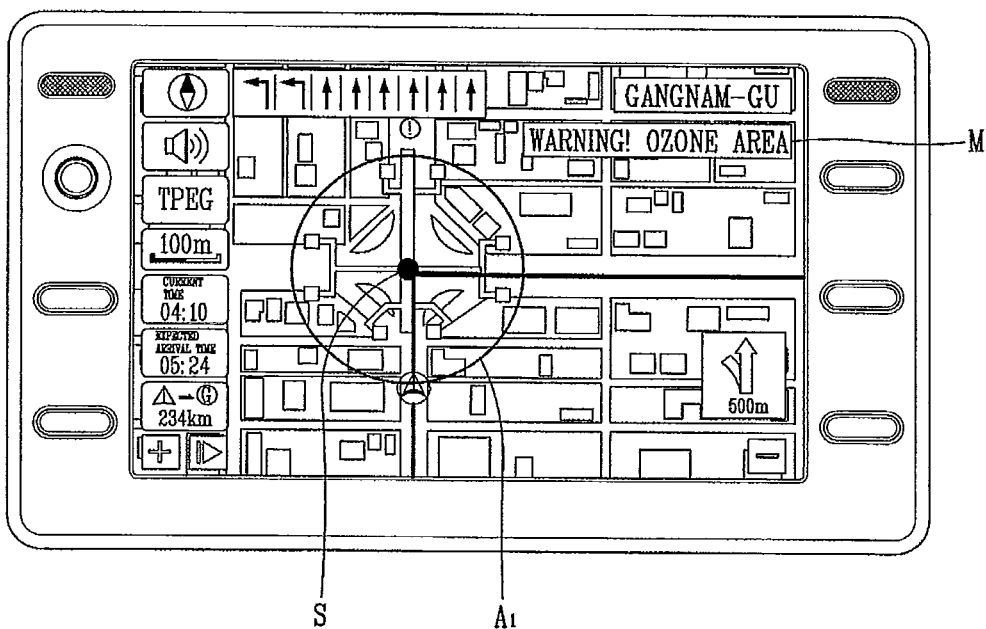
Figure 4C:
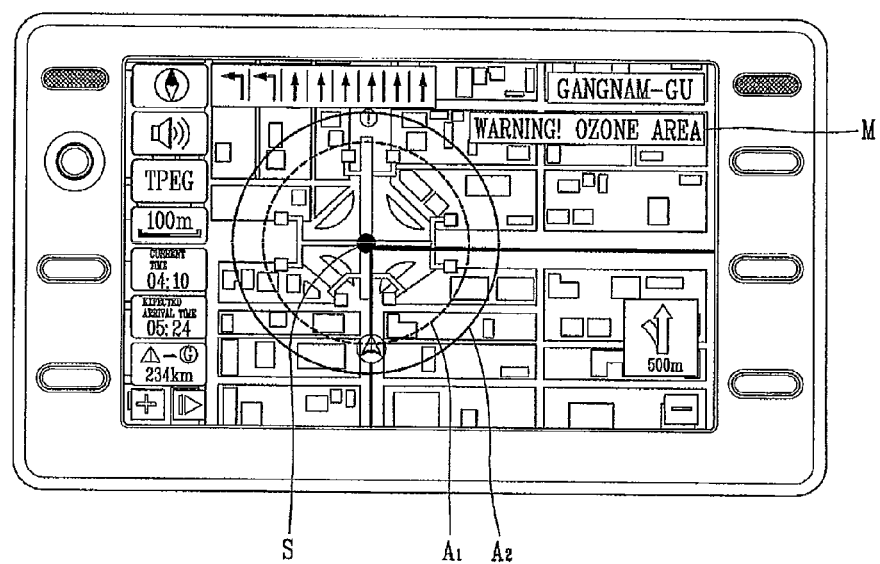

FIGS. 4a, 4b and 4c are exemplary views each showing a state that geo-fence areas are variably set by a telematics terminal.

Referring to FIG. 4a, the display 161 of the telematics terminal 100 outputs a variety of information related to the drive of the vehicle on the display screen.

The variety of information may include a map visually displaying geographical data, route information to a destination, lane-related information, a reduced scale of a map, a current time, an expected arrival time, a distance to a destination, and the like.

If a certain event has occurred, the display 161 may display a spot S where the certain event took place on the display screen. The display 161 may display brief information about the certain event on an area M of the display screen.

Referring to FIG. 4b, the controller 190 may variably set a geo-fence area $A_1$, and displays the set geo-fence area $A_1$ on the display screen using the display 161. Here, the geo-fence area $A_1$ is displayed as a circle. However, regular or irregular shape and contours may be used depending on the event, geography, time, vehicle conditions and characteristics, and other parameters.

Referring to FIG. 4c, if an event has additionally occurred after the certain event took place, the controller 190 enlarges or reduces the geo-fence area $A_1$, or sets a new geo-fence area $A_2$, and thereby to display the set geo-fence area on the display screen through the display 161.

FIGS. 5a, 5b, 5c and 5d are exemplary views each showing a state that geo-fence areas are variably set by a telematics terminal based on road data serving as a drive reference.

Figure 5A:
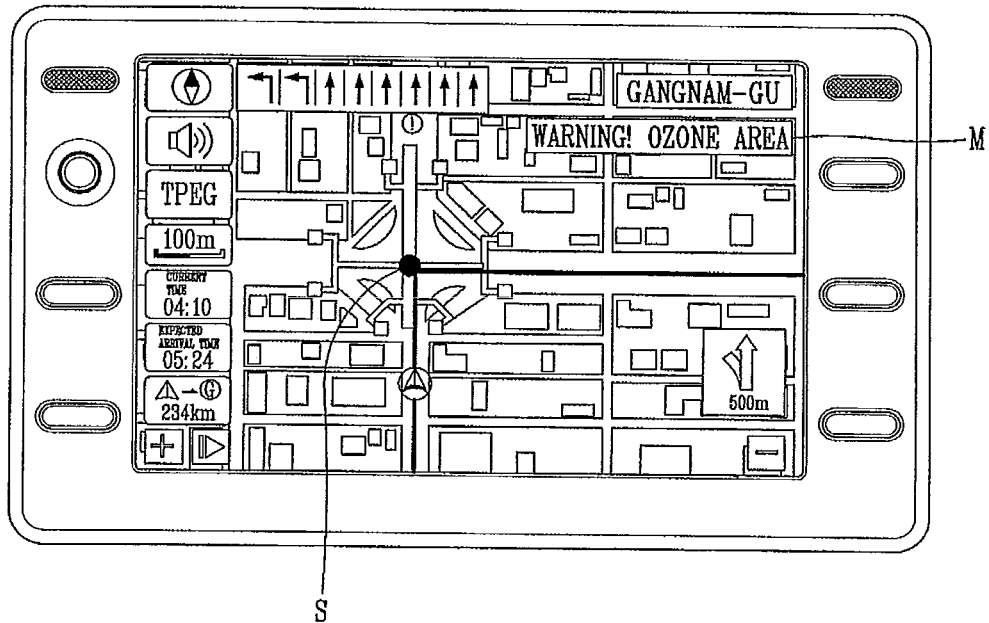
FIGS. 5a, 5b, 5c and 5d are exemplary views each showing a state that geo-fence areas are variably set by a telematics terminal based on road data serving as a drive reference according to another embodiment of the present invention.

Referring to FIG. 5a, if a certain event has occurred, the display 161 may display a spot S where the certain event took place on the display screen. The display 161 may display brief information about the certain event on an area M of the display screen.

Figure 5B:
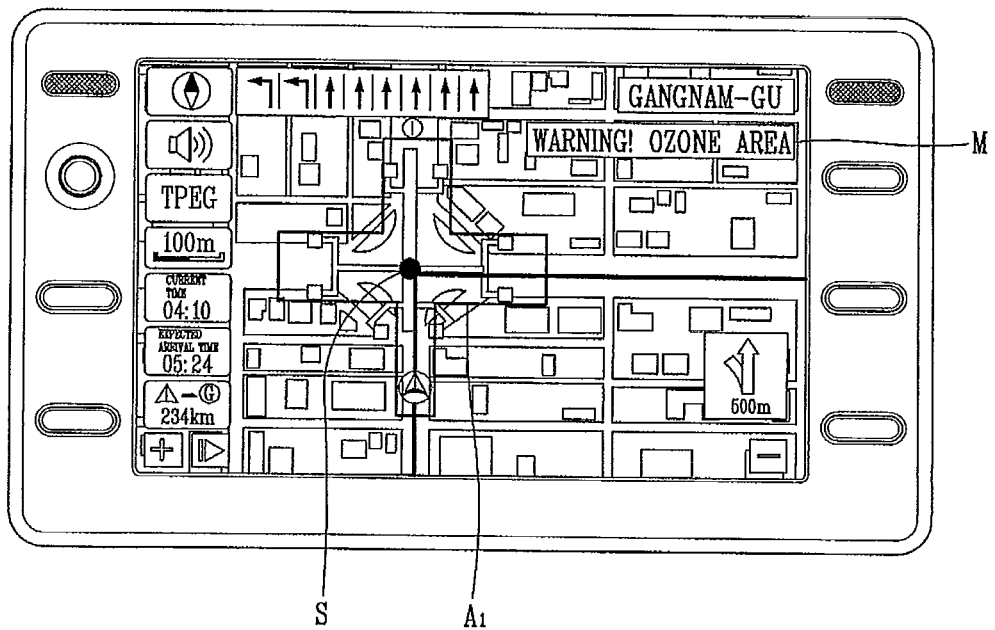

Referring to FIG. 5b, if the certain event corresponds to an event affecting vehicle drive characteristics, the controller 190 may set the geo-fence area $A_1$ by considering road information on which the vehicle can be driven, and displays the set geo-fence area $A_1$ on the display screen through the display 161.

Referring to FIG. 5b, the geo-fence area $A_1$ set by considering the road information on which the vehicle can be driven may be set on a road where the vehicle can be driven.

Figure 5C:
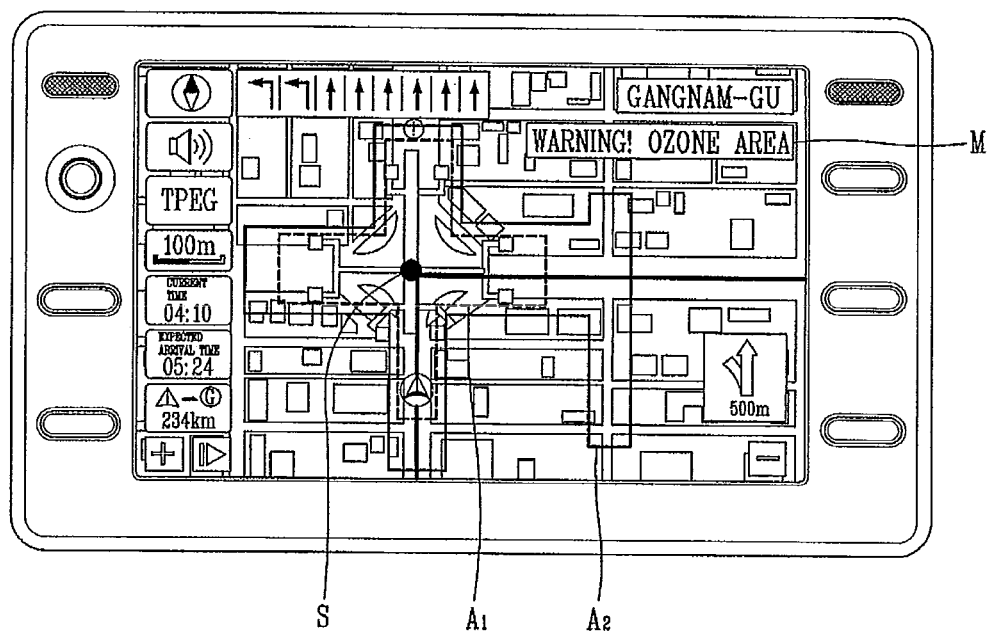

Referring to FIG. 5c, if a new event has occurred, the display 161 may display brief information about the new event on an area M of the display screen. The new event may be an event caused by the event which had been previously occurred.

The controller 190 may set a new geo-fence area $A_2$ by enlarging/reducing or changing the geo-fence area $A_1$, and display the set geo-fence area on the display screen through the display 161.

Figure 5D:
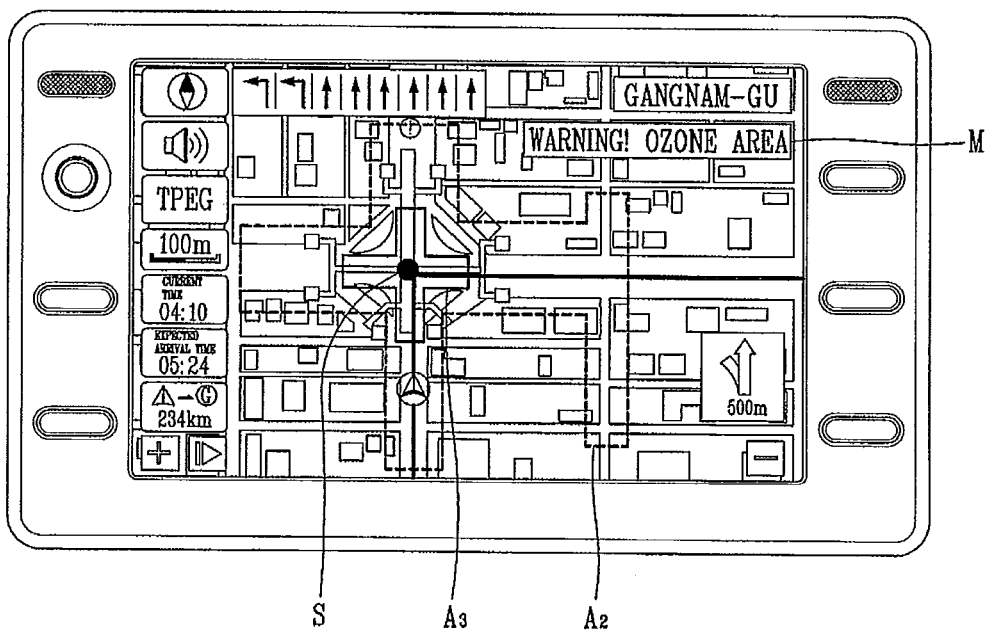

Referring to FIG. 5d, if still another event has occurred, the display 161 may display brief information about the still another event on the area M of the display screen. The controller 190 may set a new geo-fence area $A_3$ by enlarging/reducing or changing the geo-fence area $A_2$, and display the set geo-fence area on the display screen through the display 161.

According to one embodiment of the present invention, the above method may be implemented as a program recorded medium in a code that can be read by a processor. The processor-readable medium may include read-only memory (ROM), random access memory (RAM), CD-ROM, a magnetic tape, a floppy disk, an optical data storage device, and so on. Also, the processor-readable medium may be implemented in the form of a carrier wave (e.g., transmission through Internet).

The telematics terminal according to at least one embodiment of the present invention variably sets the geo-fence area upon the occurrence of the event, thereby controlling the vehicle depending on conditions and enhancing the stability as well as convenience of the vehicle drive.

The foregoing embodiments and advantages are merely exemplary and are not to be construed as limiting the present disclosure. The present teachings can be readily applied to other types of apparatuses. This description is intended to be illustrative, and riot to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for controlling a vehicle with a telematics terminal installed in or on the vehicle, comprising:
   wirelessly receiving coordinates of a geo-fence area by the telematics terminal from a remote server;
   determining whether or not the vehicle is located within the geo-fence area or is on a route that will intercept the geo-fence area;
   directly controlling the vehicle to meet predetermined drive requirements previously set for the geo-fence area, if the vehicle is determined to have entered into the geo-fence area;
   receiving updated coordinates of the geo-fence area by the telematics terminal; and
   determining whether or not the vehicle is located within a corresponding updated geo-fence area or is on a route that will intercept the updated geo-fence area;
   receiving, by the telematics terminal, information related to a predetermined event occurrence from the remote server;
   changing, by the telematics terminal, the geo-fence area based on the received information related to the predetermined event occurrence; and
   displaying the changed geo-fence area on a display.

2. The method of claim 1, wherein the geo-fence area comprises one of:
   a traffic accident geo-fence area;
   an increase of traffic volume geo-fence area;
   a decrease of traffic volume geo-fence area;
   a human activity geo-fence area;
   an environmental pollution geo-fence area;
   a natural disaster geo-fence area; and
   a weather geo-fence area.

3. The method of claim 1, further comprising:
   issuing a visible or audible alarm within the vehicle indicating that the vehicle has entered into the geo-fence area.

4. The method of claim 1, further comprising:
   audibly or visibly announcing the predetermined drive requirements previously set for the geo-fence area.

5. The method of claim 1, wherein the step of directly controlling the vehicle comprises:
   sensing operating parameters of the vehicle;
   determining whether or not the sensed operating parameters of the vehicle meet the predetermined drive requirements; and
   if the operating parameters do not meet the predetermined drive requirements
      changing the operating parameters to meet the predetermined drive requirements, or
      visibly or audibly displaying operating parameters that do meet the drive requirements.

6. The method of claim 5, wherein the step of changing the operating parameters comprises one of:
   turning on a vehicle light;
   locking a vehicle door;
   closing a vehicle window;
   preventing the vehicle from exceeding a maximum vehicle speed;
   setting a minimum distance between the vehicle and another vehicle;
   setting a vehicle gear position;
   changing a vehicle air conditioning parameter; and
   turning on a vehicle windshield wiper.

7. The method of claim 5, wherein the step of changing the operating parameters to meet the drive requirements comprises:
   displaying a user alert enabling a user to allow or disallow a change to one or more operating parameters.

8. The method of claim 1, further comprising:
   displaying the set geo-fence area on a display.

9. A telematics terminal configured to be installed in a vehicle including a position-location device configured to recognize a location of the vehicle and a wireless communication device, the telematics terminal comprising:

a controller operatively connected to the position-location module and the wireless communication device, the controller configured to
  wirelessly receive coordinates of a geo-fence area from a remote server,
  determine whether or not the vehicle is located within the geo-fence area or is on a route that will intercept the geo-fence area,
  directly control the vehicle to meet predetermined drive requirements previously set for the geo-fence area, if the vehicle is determined to have entered into the geo-fence area,
  receive updated coordinates of the geo-fence area by the telematics terminal,
  determine whether or not the vehicle is located within a corresponding updated geo-fence area or is on a route that will intercept the updated geo-fence area,
  receive information related to a predetermined event occurrence from the remote server,
  change the geo-fence area based on the received information related to the predetermined event occurrence, and
  display the changed geo-fence area on a display.

10. The telematics terminal of claim 9, wherein the geo-fence area comprises one of:
  a traffic accident geo-fence area,
  an increase of traffic volume geo-fence area,
  a decrease of traffic volume geo-fence area,
  a human activity geo-fence area,
  an environmental pollution geo-fence area,
  a natural disaster geo-fence area, and
  a weather geo-fence area.

11. The telematics terminal of claim 9, wherein the controller is configured to issue a visible or audible alarm within the vehicle indicating that the vehicle has entered into the geo-fence area.

12. The telematics terminal of claim 9, wherein the controller is configured to audibly or visibly announce drive requirements corresponding to the geo-fence area.

13. The telematics terminal of claim 9, wherein the controller is configured to
  sense operating parameters of the vehicle,
  determine whether or not the sensed operating parameters of the vehicle meet the drive requirements, and
  if the operating parameters do not meet the drive requirements
    change the operating parameters to meet the drive requirements, or
    visibly or audibly display operating parameters that do meet the drive requirements.

14. The telematics terminal of claim 13, wherein controller is configured to change the operating parameters by one of:
  turning on a vehicle light;
  locking a vehicle door;
  closing a vehicle window;
  preventing the vehicle from exceeding a maximum vehicle speed;
  setting a minimum distance between the vehicle and another vehicle;
  setting a vehicle gear position;
  changing a vehicle air conditioning parameter; and
  turning on a vehicle windshield wiper.

15. The telematics terminal of claim 13, wherein the controller is configured to display a user alert enabling a user to allow or disallow a change to one or more operating parameters.

16. The telematics terminal of claim 9, wherein the controller is configured to display the set geo-fence area on a display.

17. A motor vehicle, comprising:
  a position-location device configured to recognize a location of the vehicle;
  a wireless communication device; and
  a telematics terminal having a controller operatively connected to the position-location module and the wireless communication device, the controller configured to
    wirelessly receive coordinates of a geo-fence area from a remote server,
    determine whether or not the vehicle is located within the geo-fence area or is on a route that will intercept the geo-fence area, and
    directly control the vehicle to meet predetermined drive requirements previously set for the geo-fence area, if the vehicle is determined to have entered into the geo-fence area,
    receive updated coordinates of the geo-fence area by the telematics terminal,
    determine whether or not the vehicle is located within a corresponding updated geo-fence area or is on a route that will intercept the updated geo-fence area,
    receive information related to a predetermined event occurrence from the remote server
    change the geo-fence area based on the received information related to the predetermined event occurrence, and
    display the changed geo-fence area on a display.

* * * * *